Patented Aug. 9, 1932

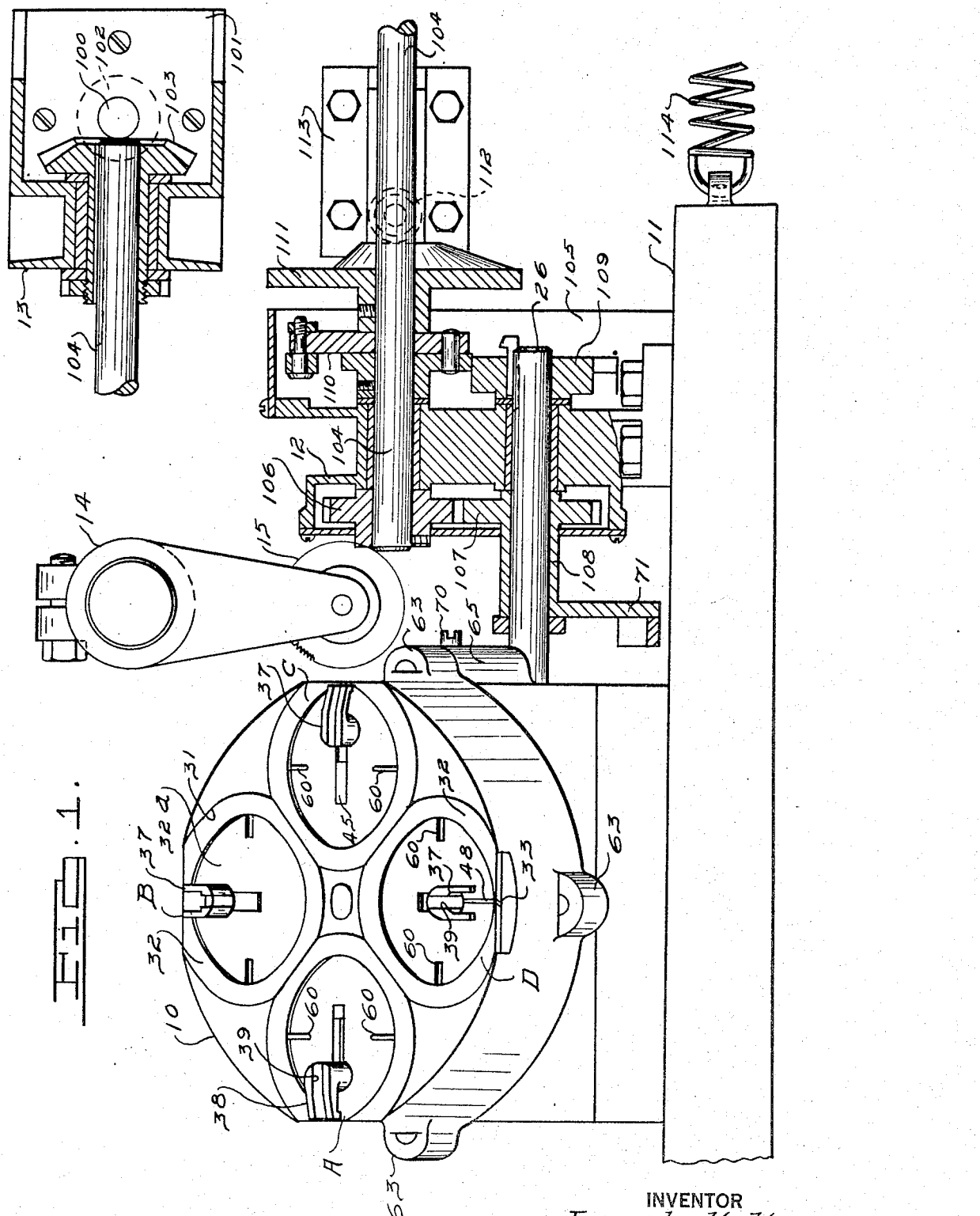

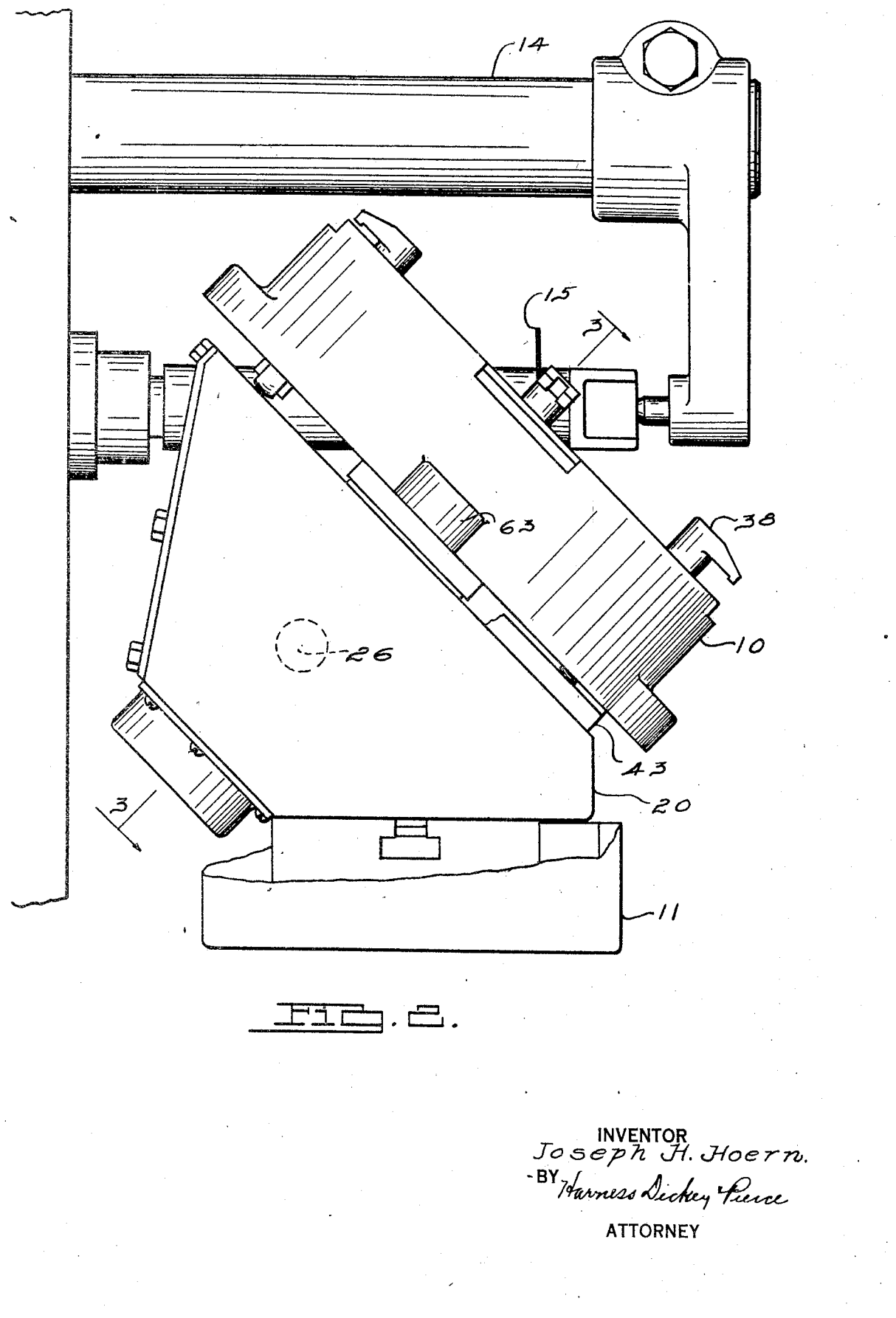

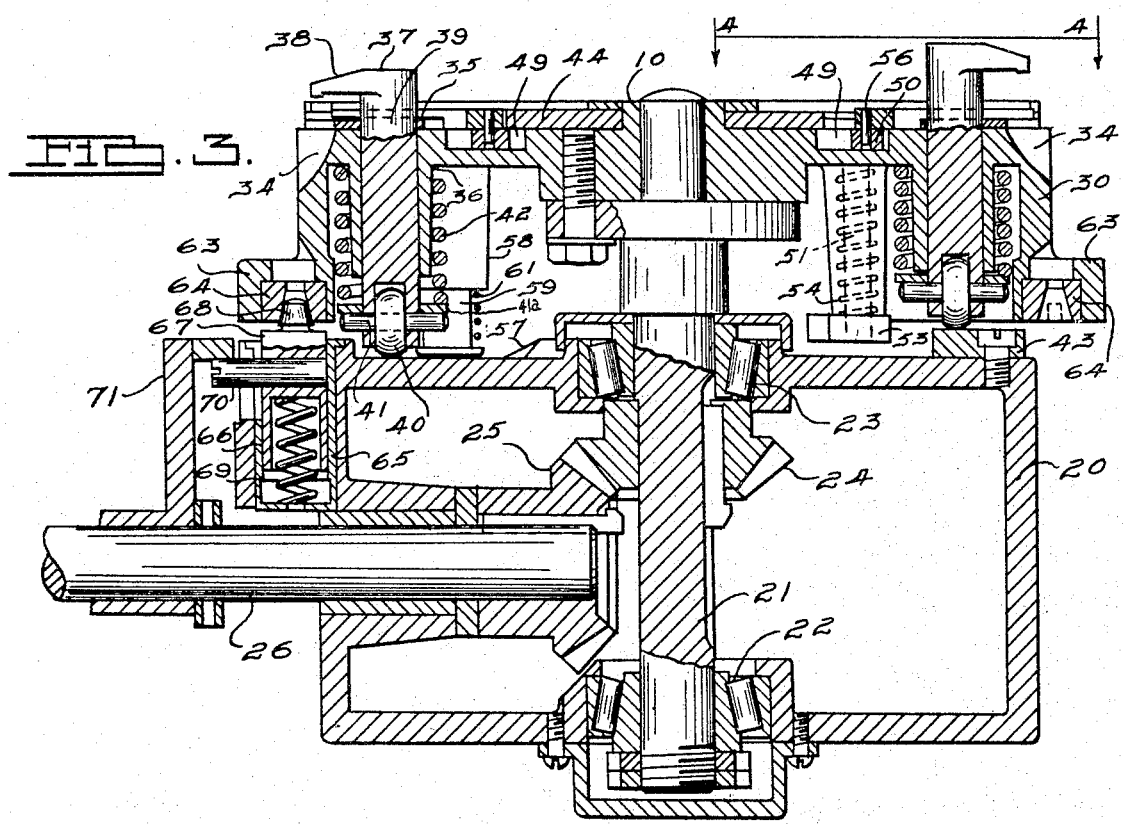
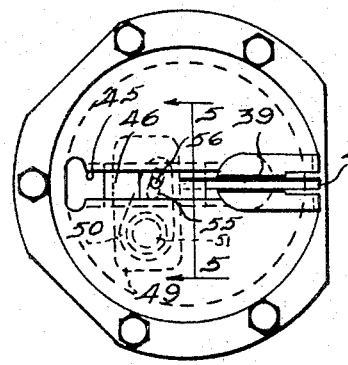
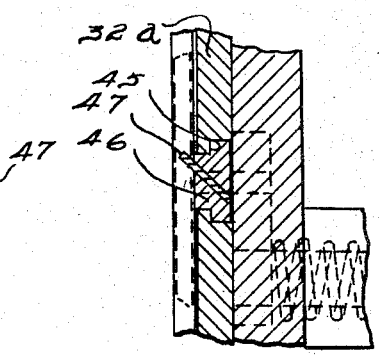

1,870,996

UNITED STATES PATENT OFFICE

JOSEPH H. HOERN, OF SAGINAW, MICHIGAN, ASSIGNOR TO WILCOX-RICH CORPORATION, A CORPORATION OF MICHIGAN

MACHINE FOR SAWING PISTON RINGS

Application filed August 31, 1929. Serial No. 389,661.

This invention relates to new and useful improvements in machines for sawing piston rings. It is sometimes necessary in the manufacture of piston rings to re-saw the clearance gap in the ring after the finishing operation in order to insure a proper and uniform clearance between the ends of the finished rings, and my machine is particularly adapted to perform this operation.

One object of my invention is to provide a machine for re-sawing the clearance gap in piston packing rings which will operate continuously and automatically and require attendance only for loading.

Another object of my invention is to provide novel means for accurately locating the ends of the ring in the machine in position to be re-sawed.

Another object of my invention is to provide a machine adapted to carry a plurality of rings during operation and adapted to present them in succession to the milling cutter by means of which the clearance gap is re-cut, and which is also adapted to eject the rings after they have been operated upon by the milling cutter.

With these and other objects in view, my invention consists in the arrangement, combination and construction of the various parts of my improved device, as described in the specification, claimed in my claims, and shown in the accompanying drawings, in which Fig. 1 is a side elevation of my machine partly in section to better illustrate the construction thereof.

Fig. 2 is an enlarged end elevation of my machine taken from the left in Fig. 1.

Fig. 3 is a sectional view taken on the line 3—3 of Fig. 2.

Fig. 4 is a view taken on line 4—4 of Fig. 3.

Fig. 5 is a view taken on line 5—5 of Fig. 4.

In general my machine comprises an intermittently rotating turret in which a plurality of ring chucks are arranged, a rotary milling cutter or saw for cutting the gaps in the rings, and mechanism for intermittently rotating the turret to bring the chucks successively into alignment with the milling cutter, and for reciprocating it to feed the work to the cutter. Each of the ring chucks in the turret is provided with an automatically operating locating tongue by means of which the ends of the rings are accurately located in position to be re-cut by the milling cutter, an automatic clamp adapted to hold the rings in position, and automatically operating ejecting means for ejecting the rings from the turret after they have been operated upon.

Specifically the machine comprises a revolving turret 10 which is mounted upon the slidable base 11. The base 11 also carries a power transmission and indexing mechanism designated generally by the numeral 12. A stationary bearing 13 is provided in which the end of the power shaft is slidably and rotatably journaled. A fixture 14 is provided upon which the milling cutter 15 is mounted and which may be driven by any conventional means such as a belt and pulley.

The turret 10 is positioned in an inclined plane as shown in Fig. 2 and rotates about an inclined axis in order to present the diagonally cut ends of the ring to the milling cutter which is in vertical position. As shown in Fig. 3, it comprises a power transmission casing 20 in which is journaled a shaft 21, having its lower end suitably held in bearings 22 in the bottom of the casing and having its intermediate portion held in bearings 23 in the top of the casing. Keyed to the shaft 21 within the casing 20 is a beveled gear 24 which engages a beveled gear 25 keyed to the end of the indexing shaft 26, which is suitably journaled in the side of the casing 20. Secured to the upper end of the shaft 21 is the turret 10, which comprises a circular member 30 centrally disposed on the shaft 21 and rotatable therewith. As shown in Fig. 1, the upper face of the turret 10 is provided with four identical ring positions or chucks 31 which are radially disposed about the center of the turret. Each of these ring positions comprises a countersunk generally circular space in the face of the turret. As shown in Fig. 3, a circular opening 35 is formed in each ring position adjacent its outer edge and a depending sleeve 36 is formed about the under edges of said opening. Slidably positioned in this opening 35 and in the sleeve 36 is a clamping member 37 whch is cylindrical in form and is provided with a laterally extending bifurcated arm portion 38 at its upper end. The upper portion of the clamping member 37 is slotted out as indicated at 39, Figs. 1 and 4, and the lower end of the member 37 is also bifurcated as shown in Fig. 3. Between the bifurcations in the lower end is positioned a roller 40 supported upon a cross-pin 41. A coil spring 42 is positioned around the sleeve 36 and bears at one end against the underside of the turret 10 and at the other end against a washer 41a, which is supported by the cross-pin 41. The spring 42 is normally tensioned to force the clamping member 37 downwardly. Secured to the top of the transmission casing 20 beneath the unloading and loading stations of the turret is a cam plate 43, with which the roller 40 is adapted to contact and raise the clamping member 37 against the compression of the spring 42.

Around the border of each ring position is a ring-like bushing 32, whose inside circumference corresponds substantially to the outside diameter of the finished piston ring when disposed upon the piston and in the cylinder in which it is to be used. The rings 32 are flattened at those edges which approach the edge of the turret member 10 and are provided with diagonal slots 33 through which the milling cutter 15 passes to engage the piston ring, and the edges of the turret 10 at these points are beveled out as shown at 34 in Fig. 3 to provide clearance for the milling cutter. Also secured in the ring positions 31 and beneath the rings 32 are plates 32a provided with openings through which the clamping members 37 extend, and also provided with slot 45 extending inwardly from the clamping member 37. This slot 45 is the shape of an inverted T in cross section as shown in Fig. 5, and in it is positioned an elongated T-shaped block 46 which has a thin tongue-like member 47 diagonally positioned and secured at its forward end, which slides in the diagonal slot 48 (Fig. 1) in the plate 32a extending outwardly from the opening for the clamping member 37, and registers with the diagonal slot 33 in the ring 32.

In the top of the turret 10 and beneath the plates 32a are formed pockets 49 (Figs. 3 and 4) and in these pockets are positioned crank members 50, shown in section in Fig. 3 and in dotted lines in Fig. 4, which are secured at one end to the top of the vertical shaft 51 shown to the right in Fig. 3. This shaft extends downwardly to a point adjacent the top of the transmission casing 20. Secured to the end of the shaft 51 is a cam member 53, and positioned around the shaft 51 between the cam member 53 and the under surface of the turret 10 is a coil spring 54 which is secured at one end to the cam 53 and at the other to a fixed anchor on the under side of the turret 10. The free end of the crank member 51, as shown in Fig. 4, is provided with an elongated slot 55 into which extends a pin 56 secured in the sliding tongue block 46. (Fig. 3.) Secured upon the top of the transmission casing 20 adjacent the shaft 21 is a cam plate 57 against which the end of the cam member 53 will strike and cause the shaft 51 to turn, thereby operating the crank member 50 to slide the tongue bar 46 inwardly in its slot and thereby retract the tongue 47 in the slot 48. The spring 54 which is attached at one end to the cam 53 and at the other to the underside of the turret 10 and will operate to turn the shaft 51 and thereby drive the tongue block 46 outwardly in its slot after the cam member 53 has ceased contact with the cam plate 57.

(Fig. 3.) Also secured to the under side of the turret 10 at each ring position and at each side thereof are depending sleeves 58 in which are secured pins 59 having a head formed on their lower ends and having blades formed on their upper ends which are adapted to project through the slots 60 (Fig. 1) formed in the plates 32a and in the top of the turret 10. A coil spring 61 is positioned around the lower end of each pin 59 and bears at one end against the lower end of the sleeve 58 and at the other end against the head flange of the pin 59, and is tensioned to force the pin 59 downwardly in the sleeve 58 and thereby retract the blade on the upper end of the pin to a position flush with or beneath the surface of the plate 32a. Another cam plate (not shown) is positioned on the top of the transmission casing 20 adjacent the unloading station so that the heads of pins 59 will engage therewith just before the ring position to which they are attached reaches the unloading station. This will cause the pins 59 to rise in the sleeves 58 against the compression of the spring 61 and will drive the blades through the slots 60 and thus kick the ring out of the turret.

(Figs. 1 and 3.) Formed in the lower edge of the turret 10 and protruding therefrom beneath each ring position are sockets 63, and (Fig. 3) in these sockets are positioned bushings 64 having downwardly presented tapered openings therein. In the side of the transmission housing 20 and adjacent and above the bearing for the shaft 26 and adjacent the position of the milling cutter is formed a socket 65 in which is set a thimble 66, and in this thimble is slidably positioned a plunger 67. On top of the plunger is formed a tapered head or pin 68 which is adapted to fit into the tapered opening in the bushing 64. The bottom part of the plunger 67 is hollow and a coil spring 69 is positioned therein, bearing at one end against the thimble 66 and at the other end against the plunger 67, tending to force the same upwardly to engage the head 68 with the bushing 64. Registering slots are provided in the outer side of the socket 65 and the thimble 66 and a pin 70 extends therethrough and is secured at one end in the plunger 67 and positioned with the other end extending outwardly through and beyond the slots. This pin co-operates with the upper edge of the slot in the socket 65 and provides a stop for the plunger and secures it in the socket and thimble. The outer end of the pin 70 is engaged by the cam member 71, which is loosely secured upon and rotates about the indexing shaft 26 and which will engage the pin 70 and force the plunger 67 downwardly in the thimble 66 and thus retract the head 68 from the socket in the bushing 64. The plunger 67 serves to lock the turret in a stationary position during the milling operation on the ring.

Power is supplied through a shaft 100 (Fig. 1) journaled in a stationary bearing bracket or box 101. To the end of the shaft is secured a beveled pinion 102 which meshes with another beveled pinion 103 slidably secured on the end of a shaft 104. The shaft 104 is slidably and rotatably journaled in the bearing box 101 and extends therefrom at right angles to the direction of the shaft 100.

Secured upon the slidable base 11 as shown in Fig. 1 is a bearing bracket 105, in the lower part of which is journaled the indexing shaft 26 and in the upper part of which is journaled shaft 104. Secured upon the left end of the shaft 104 is a gear 106 which meshes with a gear 107, which is carried by a sleeve 108 rotatably mounted upon the shaft 26. To the end of the sleeve 108 is attached the cam member 71 which co-operates with the pin 70 to operate the plunger 67 and release the turret 10 for rotation. Secured to the right end of the shaft 26 is the sprocket member 109 of a Geneva wheel, and secured to the intermediate portion of the shaft 104 is the cam and pin member 110 of the Geneva assembly adapted to co-operate with and engage the sprocket member 109. Also secured to the shaft 104 to the right of the cam and pin member 110 is a cam member 111 which is adapted to engage a roller 112 adjustably secured in a fixed bracket 113 and cause the base 11 to slide to the left thereby moving the turret 10 out of engagement with the milling cutter. Attached to the end of the sliding base 11 is a spring 114, the other end of which may be anchored to a fixed part in any conventional manner, and which operates to pull the base 11 to the left and bring the turret into engagement with the milling cutter when the low point of the cam 111 engages the roller 112.

The operation of the machine is as follows: The turret 10 is rotated intermittently by means of the Geneva assembly 109—110, shaft 26, bevel pinions 24—25 and shaft 21. As there are four work positions on the turret, the Geneva mechanism is arranged to cause the turret to make a quarter revolution at each revolution of the shaft 104. The turret is securely locked in a stationary position each time one of the ring positions is indexed to the point of engagement with the milling cutter 15. This is accomplished by means of the spring plunger 67 engaging the socketed bushing 64. This lock is released by the cam member 71, which, driven by the gears 106 and 107 engages and retracts the plunger 67 by means of the pin 70 upon completion of each milling operation. Each time the milling operation is completed the turret 10 will be moved away from the milling cutter by the action of the cam member 111 in engagement with the roller 112 and indexed by the Geneva mechanism, and the turret will be pulled into engagement with the milling cutter by means of the spring 114 each time the indexing movement is completed.

The rings are loaded in the turret at the position "A" and are located by positioning the ends of the ring on opposite sides of the tongue 47 and bringing one end firmly against it. At this point the tongue 47 is extended into the slot 33 in the ring 32. The turret is then indexed to the right to position "B" and the clamping members 37 are moved downwardly until the arms 38 engage the ends of the piston ring on each side of the gap and firmly clamp them against the plate 32a. The turret is then indexed to position "C", which is the sawing position, and as it approaches this position the cam member 53 on the shaft 51, which operates the locating tongue 47, engages the cam plate 57 and causes the shaft 51 to rotate and retract the tongue 47 from the ring gap. When position "C" is reached the high portion of cam member 111 on the shaft 104 runs out of contact with the roller 112 and permits the spring 114 to draw the base 11 and the turret 10 to the right against the milling cutter 15 which will enter the slot 33 in the ring 32 and engage and trim the ends of the piston ring which are registered with this slot 33. The turret then moves to the unloading position "D" and the roller 40 on the end of the clamping member 37 engages the cam plate 43 on the transmission casing 20 and raises the clamping member to free the ring. Also the kick-out pins 59 will engage cam plates on the transmission casing 20 and be forced upwardly so that their blades will protrude through the slots 60 and force the piston ring out of the holding ring 32. The turret will then index to bring the ring position back to the loading position "A".

The kick-out pins during this indexing movement to loading position will run out of contact with their cam members on the transmission casing 20 and will retract so that the ends of their blades will be flush with or below the surface of the plate 32a. The clamping member 37, however, is still held in raised position and does not come out of engagement with its cam plate 43 until the indexing movement to position "B". Also as the ring position indexes from the unloading station "D" to the station "A" the cam member 53 on the shaft 51 controlling the locating tongue 47 will run out of contact with its cam plate 57 and the spring 54 will cause the shaft 51 to rotate and drive the locating tongue 47 outwardly into the slot 33 in the holding ring 32.

Formal changes may be made in the specific embodiment of the invention described without departing from the spirit and substance of the broad invention, the scope of which is commensurate with the appended claims.

What I claim is:

1. Apparatus for recutting gaps in piston rings comprising, in combination, a cutter, a base member, a turret rotatably mounted thereon, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, spring urged clamps mounted in said turret and positioned to clamp the rings in said chucks, normally restrained ejecting members mounted in said turret and positioned to engage the under side of the ring in each chuck, means for moving said turret to bring said ring chucks into alignment with said cutter and for producing a relative feeding movement between said cutter and turret, means operable by the movement of said turret relative to said base for retracting said tongues in advance of said cutter, and means operable by said movement for releasing said clamps and actuating said ejecting members after the operation of said cutter.

2. Apparatus for recutting gaps in piston rings comprising, in combination, a cutter, a base member, a turret rotatably mounted thereon, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, normally restrained ejecting members mounted in said turret and positioned to engage the under side of the ring in each chuck, means for moving said turret to bring said ring chucks successively into alignment with said cutter and for producing a relative feeding movement between said cutter and turret, means operable by the movement of said turret relative to said base for retracting said tongues in advance of said cutter, and means operable by the movement of said turret relative to said base for actuating said ejecting members to force said rings from said chucks after the operation of said cutter.

3. Apparatus for recutting gaps in piston rings comprising, in combination, a cutter, a base member, a turret rotatably mounted on said base member, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, spring urged clamps mounted in said turret and positioned to clamp the rings in said chucks, means for moving said turret to bring said ring chucks successively into alignment with said cutter and for producing a relative feeding movement between said cutter and turret, means operable by the movement of said turret relative to said base for retracting said tongues in advance of said cutter, and means operable by the movement of said turret relative to said base for releasing said clamps after the operation of said cutter.

4. Apparatus for recutting gaps in piston rings comprising in combination a cutter, a base member, a turret rotatably mounted on said base member, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot whereby the ring ends are positioned relative to said cutter slot, means for moving said turret to bring said chucks successively into alignment with said cutter and for producing a relative feeding movement between said turret and cutter, cranks in said turret and engaging said tongues, and means on said base positioned to actuate each of said cranks to retract said tongues in advance of said cutter.

5. Apparatus for recutting gaps in piston rings comprising, in combination, a cutter, a rotatably mounted turret, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, means for moving said turret to bring said ring chucks successively into alignment with said cutter and for producing a relative feeding movement between said turret and cutter, and means for retracting said tongues relative to said cutter slots in advance of said cutter.

6. Apparatus for recutting gaps in piston rings comprising, in combination, a cutter, a rotatably mounted turret, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, means for moving said turret to bring said ring chucks successively into alignment with said cutter and for producing a relative feeding movement between said turret and cutter, and means for retracting said tongues relative to said cutter slots in advance of said cutter and for advancing the same after the operation of said cutter.

7. Apparatus for recutting gaps in piston rings comprising, in combination, a cutter, a rotatable turret, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, clamps mounted in said turret and positioned to clamp the rings in said chucks, ejecting members mounted in said turret and positioned to oust the rings from said chucks, means for moving said turret to bring said chucks successively into alignment with said cutter and for producing a relative feeding movement between said turret and cutter, means for manipulating said tongues controlled by the movement of said turret, and means for operating said clamps and said ejecting members controlled by the movement of said turret.

8. Apparatus for recutting gaps in piston rings comprising, in combination, a cutter, a rotatable turret, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, clamps mounted in said turret and positioned to clamp the rings in said chucks, means for moving said turret to bring said chucks successively into alignment with said cutter and for producing a relative feeding movement between said turret and cutter, means for manipulating said tongues controlled by the movement of said turret, and means for operating said clamps controlled by the movement of said turret.

9. Apparatus for recutting gaps in piston rings comprising, in combination, a cutter, a rotatable turret, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, ejecting members mounted in said turret and positioned to oust the rings from said chucks, means for moving said turret to bring said chucks successively into alignment with said cutter and for producing a relative feeding movement between said turret and cutter, means for manipulating said tongues controlled by the movement of said turret, and means for operating said ejecting members controlled by the movement of said turret.

10. Apparatus for recutting gaps in piston rings comprising, in combination, a cutter, a rotatable turret, a plurality of ring chucks mounted in said turret each adapted to confine a piston ring to a predetermined circumferential dimension and having a slot therein adapted to admit said cutter, a tongue member in each of said chucks positioned to intervene in the gap between the ends of a piston ring and to register with said cutter slot, means for alternately rotating said turret to bring said chucks successively into alignment with said cutter and for producing a relative feeding movement between said cutter and turret, and means for manipulating said tongues controlled by the rotation of said turret.

11. Apparatus for recutting gaps in piston rings comprising the combination of a pair of elements comprising a cutter, and a chuck adapted to confine a ring to a predetermined circumferential dimension and having a slot therein adapted to admit said cutter, a tongue member carried by said chuck and positioned to intervene in the gap between the ends of the ring and to register with said cutter slot whereby the ring ends are positioned relative to said slot, means for producing a relative feeding movement between said chuck and cutter, and means automatically controlled by movement of the movable elements of the pair for retracting said tongue in advance of said cutter.

12. Apparatus for recutting gaps in piston rings comprising the combination of a pair of elements comprising a cutter, and a chuck adapted to confine a ring to a predetermined circumferential dimension and having a slot therein adapted to admit said cutter, a tongue member carried by said chuck and positioned to intervene in the gap between the ends of the ring and to register with said cutter slot whereby the ring ends are positioned relative to said slot, means for producing a relative feeding movement between said chuck and cutter, and means automatically controlled by movement of the movable elements of the pair for retracting said tongue relative to said cutter slots in advance of said cutter and for advancing said tongue after the operation of said cutter.

JOSEPH H. HOERN.